C. Deyhle,
Saw-Set,

Nº 82,500.   Patented Sep. 29, 1868.

Witnesses.   Inventor.
W. Otto Grouen.   Christian Deyhle
James H. Dills.

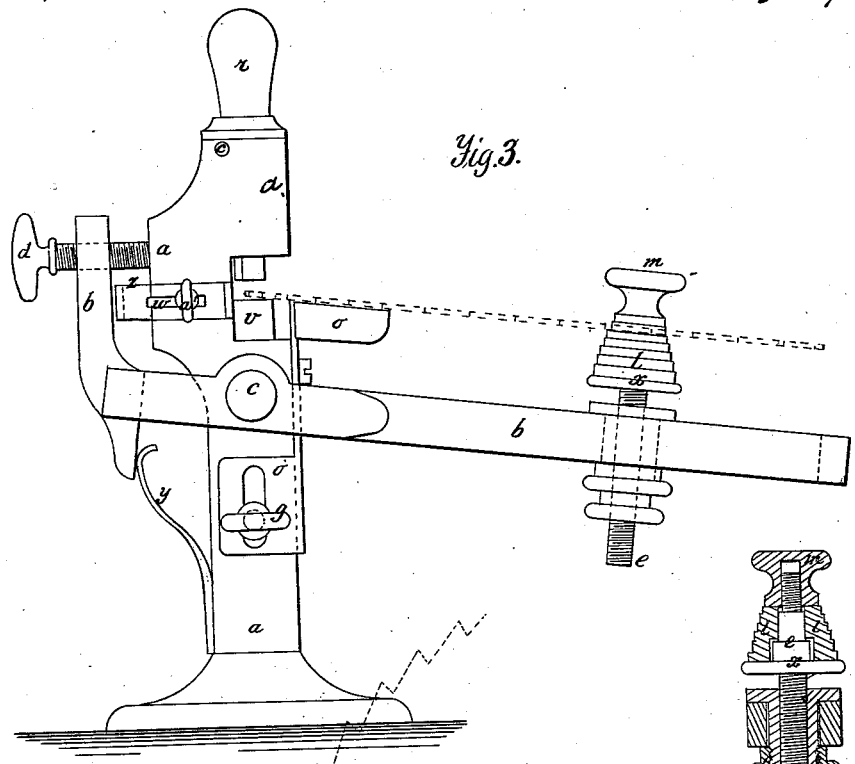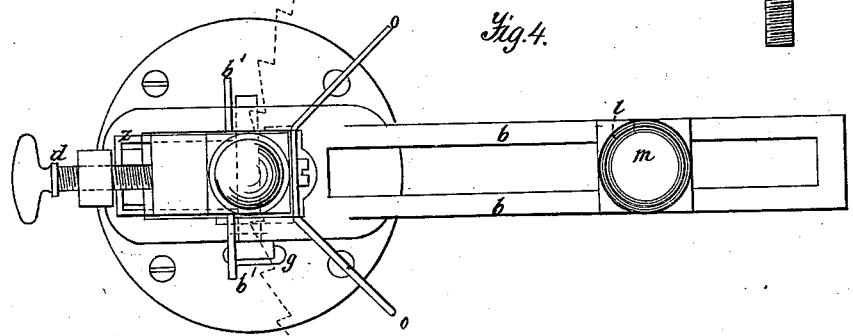

United States Patent Office.

CHRISTIAN DEYHLE, OF HARTFORD, CONNECTICUT.

*Letters Patent No. 82,500, dated September 29, 1868.*

---

IMPROVEMENT IN SAW-SET.

---

The Schedule referred to in these Letters Patent and making part of the same.

---

TO ALL WHOM IT MAY CONCERN:

Be it known that I, CHRISTIAN DEYHLE, of Hartford, in the county of Hartford, and State of Connecticut, have invented a new and useful Improved Saw-Set; and I do declare that the following is a full and exact description thereof, which will enable those skilled in the art to make and use the same, reference being had to the accompanying drawings, forming a part of this specification, in which—

Figure 1:
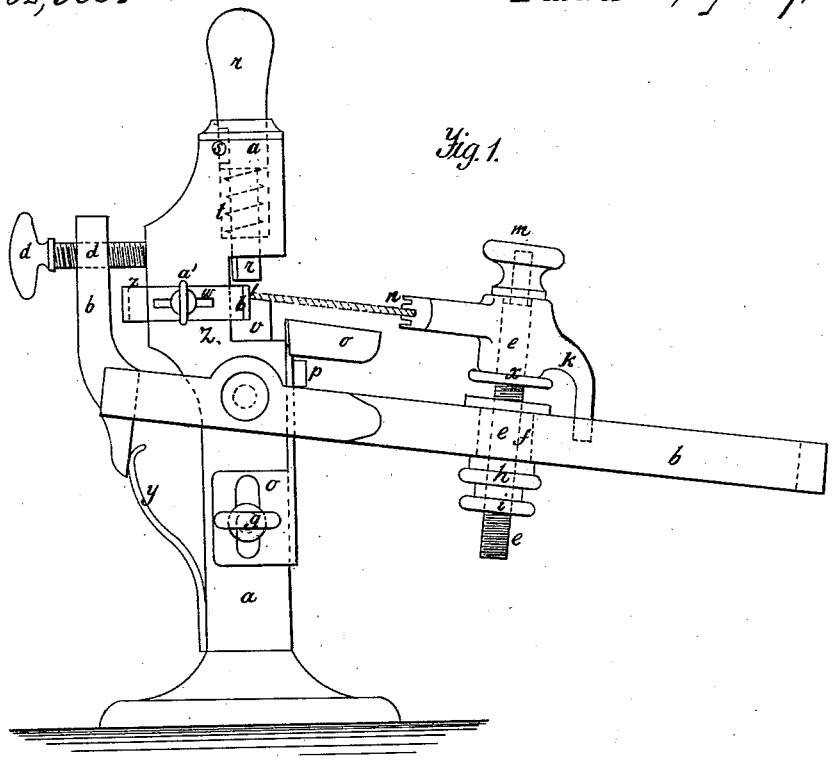
Figure 2:
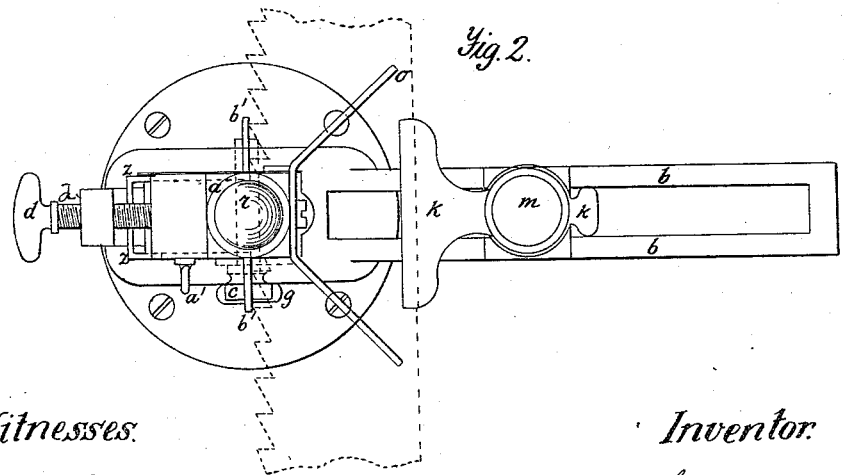

Figure 1 is a side view, with straight saw.
Figure 2 is a top view, with straight saw.
Figure 3 is a side view, with circular saw.
Figure 4 is a top view, with circular saw.
Figure 5 is a detached sectional view of what is known in this specification as the "movable rest," with the saw-holder for circular saws secured thereon.

All the parts of this machine are of iron, or other suitable metal, except the punch $r\,r$ and spring $y$, which are better made of steel.

My saw-set consists of a standard, $a\,a$; of a rack, $b\,b$, turning on an axis at $c$, and regulated in position by the screw $d$ and spring $y$; of a "movable rest," composed of the screw $e\,e$, working in the circular nut $f$, said circular nut sliding in the rack $b\,b$, and fastened at any desired point therein by means of nuts $h$ and $i$. The screw $e\,e$ has also another nut or collar upon it, $x$, upon which is placed either of the saw-holders, $k$ or $l$, as it is wished to set a straight or a circular saw. Both holders are secured in place when in use by the top nut $m$.

The saw-holder $k$, with the broad flange, as seen in fig. 2, and with the tail-piece, as seen in figs. 1 and 2, which said tail-piece just fills the groove in the rack $b\,b$, and keeps the saw-holder steady in position, is designed for straight saws, and has one or more different-sized creases at $n$, to receive saw-backs.

The holder $l$ is designed for circular saws, and consists of one piece, so shaped as to form a series of successive concentric cylinders, set one upon the other, and regularly diminishing in size from the bottom to the top, so that some one of these cylinders may fit the centre hole of every circular saw.

My saw-set consists, further, of a supporter, $o\,o$, bent at the top nearly in the form of three chords of three continuous arcs of the same circle as seen in fig. 2, the whole supporter sliding up and down on screws $p$ and $g$, which last screw is a thumb-screw, and regulates the height of the supporter.

My saw-set consists, further, of a regulator, $z\,z$, sliding, by means of the slot $w$, upon the thumb-screw $a'$. The use of this regulator is to determine the distance, by means of its face-flanges $b'\,b'$, to which the teeth of a straight saw shall impinge upon the anvil $v$.

And lastly, my saw-set consists of the punch $r\,r$, sliding in a circular slot in the top of the standard $a\,a$. The length of its play is regulated by the pin $s$, and the punch is kept at the top of its play by the spiral spring $t\,t$. The lower end of the punch is triangular, and strikes upon the anvil $v$.

The saw-set is operated as follows:

The holder $k$ or the holder $l$ is secured upon the collar $x$ by means of the top nut $m$. The "movable rest" is graduated at the proper point to bring the saw-teeth on the anvil $v$. If a straight saw is to be set, the regulator $z\,z$ is set in connection with the "movable rest." The desired cant or inclination is given to the rack $b\,b$ by means of screw $d$. The supporter $o\,o$ is secured at the proper height by means of the screw $g$, and then, by by striking upon the top of the punch $r\,r$ with a hammer or mallet, each tooth is successively set.

I am aware that the use of a truncated cone, moving out from the anvil, on a path whose plane is parallel to the plane in which the face of the anvil lies, as in patent No. 15,007, issued from the United States Patent Office, is old, and this I do not claim as my invention, nor do I claim as new anything not expressly specified hereinafter; but

What I claim as my invention, and desire to secure by Letters Patent, is—

1. The combination and arrangement of rack $b\,b$, screw $d$, and spring $y$, when used for the purpose of adjusting the inclination of rack $b\,b$, as described.

2. The supporter $o\,o$.

3. The saw-holders $k$ and $l$, when used in combination with rack $b\,b$ and supporter $o$, for the purpose set forth.

CHRISTIAN DEYHLE.

Witnesses:
G. W. WEST,
EDWIN E. MARVIN.